United States Patent [19]
Garbe

[11] 3,956,059
[45] May 11, 1976

[54] METHOD OF REDUCING MOISTURE CONTENT OF PARTICULATE SLURRIES

[75] Inventor: Carl W. Garbe, San Carlos, Calif.

[73] Assignee: Dames & Moore, San Francisco, Calif.

[22] Filed: Feb. 22, 1974

[21] Appl. No.: 444,633

[52] U.S. Cl. .......................... 159/47 WL; 61/1 F; 159/1 S; 159/49
[51] Int. Cl.$^2$ ...................... B01D 1/00; E02B 3/00
[58] Field of Search .............. 23/272 AH, 293, 298, 23/303; 159/1 G, 47, 1 S, 49; 203/10; 61/1, 55, 56; 34/93; 259/145, 146

[56] References Cited
UNITED STATES PATENTS

| | | | |
|---|---|---|---|
| 3,290,231 | 12/1966 | Ries | 159/1 S |
| 3,456,708 | 7/1969 | Jansson et al. | 159/44 UX |
| 3,578,071 | 5/1971 | Johnston | 159/49 X |
| 3,592,667 | 7/1971 | Kelly et al. | 159/49 |
| 3,775,984 | 12/1973 | Livingston | 61/35 |
| 3,801,474 | 4/1974 | Castellucci et al. | 159/1 S X |
| 3,880,703 | 4/1975 | Hardman | 159/47 |

Primary Examiner—Morris O. Wolk
Assistant Examiner—Michael S. Marcus
Attorney, Agent, or Firm—Townsend and Townsend

[57] ABSTRACT

Water evaporates from a thin film, which can be developed over the surface of soil/water slurries, at a rate as much as 30 times that of the normal pan evaporation rate in a given locale. Utilizing this discovery, a slurry having suspended solid particles which are heavier than water are placed in a shallow lagoon. The slurry is then periodically agitated through its entire profile. This agitation is repeated as often as either the formation of a dry surface appears over the lagoon or, alternatively, a noticeable clear water skin forms over the suspended solids of the slurry. By the expedient of sequentially repeating the agitation, evaporation of water present in the slurry can occur at a rate on the order of 30 times the normal pan evaporation rate of a given locale.

4 Claims, 1 Drawing Figure

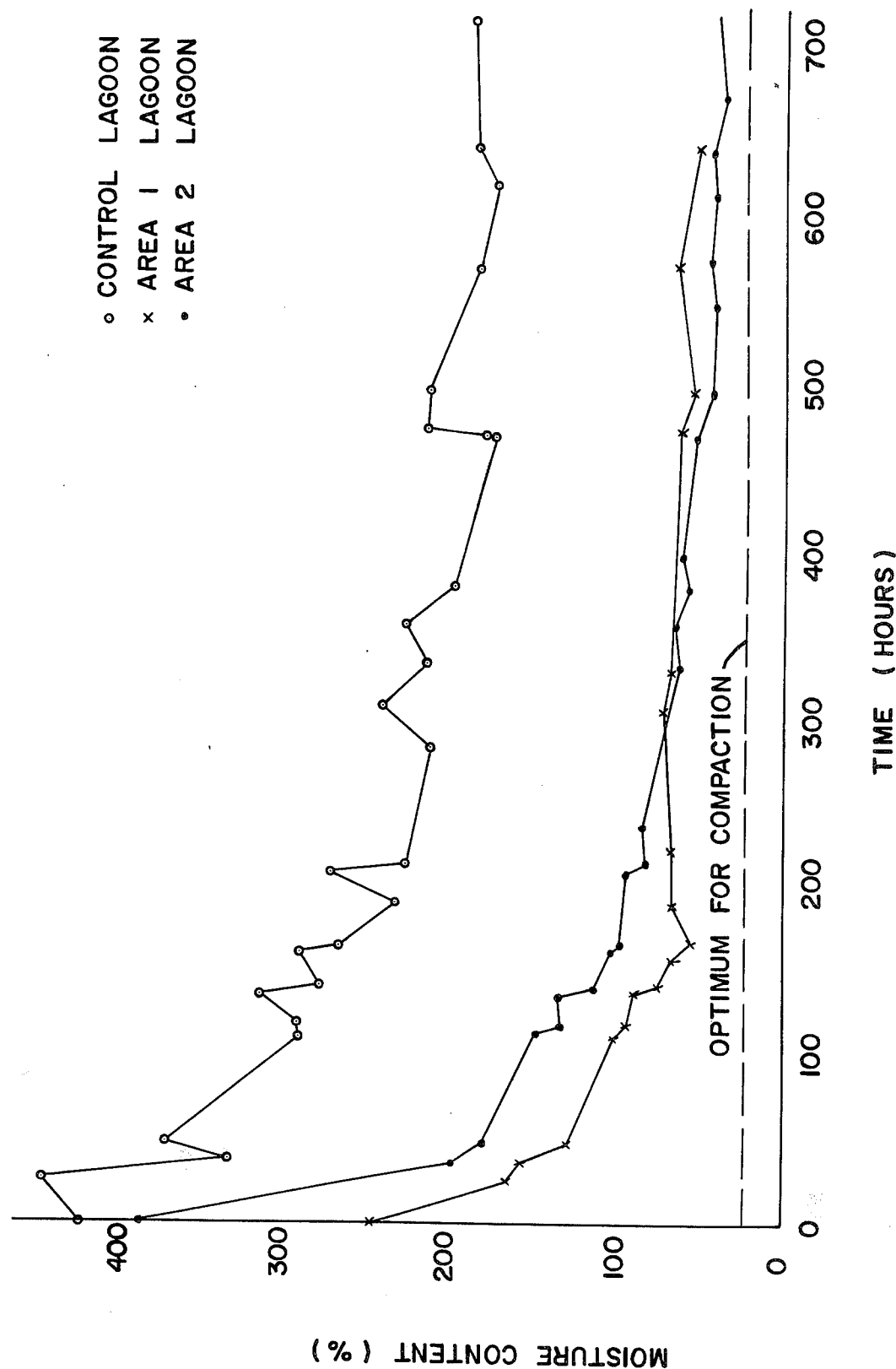

METHOD OF REDUCING MOISTURE CONTENT OF PARTICULATE SLURRIES

This invention relates to the evaporation of water from slurries.

SUMMARY OF THE PRIOR ART

It is generally assumed that the amount of energy required to evaporate water is equal to that necessary to elevate the water to the boiling point, and additionally, the latent heat of vaporization. Moreover, the term "pan rate" has been used to describe the average rate, in inches per year, at which water will evaporate naturally in a given geographic locale, from standing water in a pan or pond.

The evaporation of water from slurries has produced particular problems. Where slurries are accumulated unnaturally (as by dredging), consolidation and stabilization of the slurries has been exceedingly time consuming and difficult. Moreover, many industrial processes yield tailings in slurry form. Examples of such slurry tailings include bauxite tailings from aluminum processes, phosphate slimes, hydraulically transported fly ash from power plants, petroleum refinery wastes, paper mill wastes, and the wastes of sewage treatment plants.

Such slurries have heretofore been deposited in large lagoons. Depending upon their depth, these slurries retain their moisture indefinitely. Moreover, they occupy large areas of flat and often otherwise relatively desirable lands. Finally the large lagoons, in occupying land, often undesirably change the ecological environment. Because of the presence of such lagoons, as an undesirable by-product, many industries are prohibited from entering otherwise highly desirable production areas at all.

Heretofore, slurries have been agitated. This agitation has resulted in an increased evaporation rate. However, the parameters necessary to control agitation have not been understood and have not been set forth. Accordingly, it is the primary object of my invention to set forth parameters for optimum agitation to produce maximum evaporation of water from slurries and, thereby, to consolidate and stabilize the solid phase of the slurries.

SUMMARY OF THE INVENTION

I have discovered that water evaporates from thin films, developed over the surface of soil/water slurries at a rate as much as 30 times that of the normal pan evaporation rate in a given area. Utilizing this discovery, a slurry having suspended solid particles heavier than water, at least 50% of the solid particles which preferably can pass a U.S. Standard Number 200 mesh sieve, is placed in a shallow slurry. The slurry is periodically agitated through its entire profile. This agitation is repeated as often as either the formation of a dry surface appears over the slurry, or alternatively, a noticeable clear water film forms over the slurry. By the expedient of sequentially repeating the agitation, evaporation of water present in a slurry contained in the slurry can occur at a rate as much as 30 times the normal pan evaporation rate of a given area.

It is my belief that the unusual evaporative rate is associated with a specific microscopic thickness of water film (believed to be on the order of 1 or 2 mils), and I produce this thickness of film regularly, but temporarily, as the solid particles settle out of the soil/water slurry. Thus, at the instant a given agitation has been accomplished, a uniform mixture of soil particles and water exists throughout the slurry profile. Thereafter, the soil particles, being more dense than water, begin to settle through the water, and, in so doing, yield an ever increasing thickness of clear water covering the slurry. At some point, the thickness of the clear water film is optimum for "unusual" evaporation.

If the settling rate of the solids is less than the unusual evaporative rate, a dry skin will be formed over the slurry; this is the case with thick slurries (high solids content). If the settling rate exceeds the unusual evaporative rate, a clear water film (now subjected to vaporization at the pan rate) will form; this is the case with thin slurries (low solids content). It is evident, therefore, that the frequency of agitation should be adjusted to accomodate the settling rate (which may vary if the slurry thickens), and that the optimum frequency of agitation will be directly related to the time required for development of the optimum film thickness.

OTHER OBJECTS AND ADVANTAGES OF THE INVENTION

It is a primary object of this invention to disclose the visual parameters for controlling the frequency of agitation of a slurry to effect the unusual evaporation. Particularly, agitation is controlled at a rate to prevent either the formation of a dry surface over the slurry, or alternatively, the presence of a visible water skin.

An advantage of the use of the parameters set forth is that when a slurry is agitated in accordance with these parameters, a clear water film is formed over the soil/water slurry, believed to be on the order of 1 to 2 mils of thickness. This film is regularly generated, as previously described, and from this film maximum evaporation occurs.

A further advantage of followng the visual parameters for controlling agitation is that the process can be carried out practically in the field by relatively unskilled personnel who have undergone a minimum of training. Precise laboratory measurement in the field of slurry-water film thickness is not required.

A further object of this invention is to set forth a process to get rid of moisture from artificially made or artificially displaced slurries. According to this aspect of the invention, the slurries are deposited in a shallow lagoon where they can be conveniently agitated according to the agitation parameters of this invention by either floating equipment or equipment working from a solid working surface at the base of the lagoon.

An advantage of this invention is that the lagoons may be re-used ad infinitum, since the dewatered slurries yield a firm and stable base for iteration of the process in the same area.

A further advantage of this invention is that the area necessary to effect evaporation of water is vastly reduced. Due to this reduction in area, interference with the ecology of the ambient environment is reduced to a minimum.

Yet another advantage of this invention is that by the expedient of providing an evaporative process which can reduce slurries to solids, industries having slurry outputs which were heretofore unacceptable to many environments can be made acceptable by evaporation of the water from the slurry to generate materials suitable for use as earth borrow, or easily and inoffensively stored.

Other objects, features and advantages of this invention will be more apparent after referring to the following specification and attached drawing in which:

The FIGURE is a graph plotting on the vertical axis the percentage of moisture content (ratio or total liquids to total solids) and plotting on the horizontal axis time in hours for the evaporation of slurry in an environment with evaporation compared between an untreated control lagoon and lagoons in which the agitation method of this invention is practiced.

DESCRIPTION OF THE PREFERRED EMBODIMENTS

In accordance with the practice of this invention, the slurry on which this invention can be practiced must contain soil particles that are heavier than water. Moreover, the water-soil slurry must be capable of forming at the uppermost surface thereof upon agitation for a limited period of time a true soil particle/water suspension. As has herein been previously set forth, this suspension thereafter yields a surface film of clear water on the surface of the slurry believed to be on the order of 1 to 2 mils thick, from which the rapid evaporation that I have discovered occurs.

It is preferred (but not essential) that the soil particles pass a 200 mesh screen; particles which are larger cannot fully realize the economization and evaporation time necessary for the practice of this invention.

Having selected a slurry suitable for the practice of my technique, the next aspect of this invention is to place the slurry in a shallow lagoon. The lagoon, as a practical matter, can be unlimited in area. In depth, lagoons should be no more than that depth which would yield 6 to 8 inches of compacted solids, or, alternatively, at which agitation equipment can find a solid bottom from which to work and at the same time agitate the slurry. With this limitation, lagoon depths in excess of 5 feet are generally not likely. Preferable lagoon depth is in the range of 1 foot to 2 feet.

After the lagoon has been filled with the slurry to be evaporated, agitation commences. One presently practical way of agitating a lagoon in the order of 1.5 feet deep is to periodically run through the lagoon a sheep's foot compactor. Typically, the sheep's foot compactor will work from and rest on the solid bottom of the lagoon and effect agitation of the surface of the lagoon as the feet of the compactor pass through the surface of the slurry while the compactor is driven through the lagoon.

In accordance with my invention, the frequency of agitation of the lagoon is controlled. Broadly, agitation is effected to prevent either the formation of a dry surface over any portion of the lagoon or, alternatively, the formation of a visible water film over the slurry.

Regarding the formation of a dry skin over the top of the lagoon, it has become apparent that the presence of such dry surfaces prevents the communication of air capable of absorbing water with the underlying water-saturated slurry. More importantly, I have discovered that such surfaces prevent the formation of the 1 to 2 mils water film on the surface of the slurry. When the formation of the 1 to 2 mils film is prevented, the rapid evaporation rates possible are not attained.

It should be noted that it is much more common for slurries to have formed over their surface a visible film of water between lower and settled solid particulate matters and the atmosphere which absorbs the water vapor from the slurry. I have observed that this film of visible water, believed to be in excess of 1 to 2 mils thick, over the slurry, causes evaporation to decrease in the order of at least 1/30 of the unusual evaporation rate which exists when the slurry is covered with a water film believed to be in the range of 1 to 2 mils thick.

Thus, it will be seen that the agitation is to perpetuate that state in which a recently disturbed slurry yields a thin film over its solid particulate matters in the order of 1 to 2 mils thick. Anything which effectively produces this result will attain the accelerated evaporation rate taught in this invention.

As a practical matter, I have discovered that surface agitation of a slurry specifically and more generally agitation of a shallow lagoon by the periodic passing of earth moving or compacting equipment through the lagoon at frequencies which either prevent the formation of either a dry surface of alternately a visible water layer will result in the greatly accelerated evaporation rate of my invention.

Referring to the plot which I have disclosed with this invention, it will be seen that the percentage moisture content of a slurry asymptotically approaches the minimum level associated with firm soil upon agitation. I have found that with increasing moisture content, a decreasing frequency of agitation is required. Thus, as the moisture content passes below 100%, the agitation of the slurry by the passing of grading equipment through the lagoon decreases in frequency and the time interval between successive agitation increases.

It should be appreciated that as the moisture content of the slurry approaches the optimum for compaction, the lagoon will become increasingly viscous. Accordingly a greater amount of power will be required to affect each successive agitation. Realizing this, another practical parameter as to the depth of the lagoon is obtained. Clearly, the lagoon must not be of a depth so that in the final stages of the agitation process, the mechanical equipment chosen for agitation cannot move through the bog.

Example

Dredging spoils (or slurries) having a moisture content exceeding 375% (% water divided by % solids) and having soil particles that pass a 200 mesh screen are deposited on flat, dry land from an adjacent bay to a thickness of 18 inches by pumping by a conventional hydraulic dredge to cover approximately 2 acres of land. A conventional bulldozer is used to agitate the slurry by making sequential passes through the atmosphere exposed slurry. The operator of the bulldozer is instructed to keep the surface of the slurry sufficiently agitated to prevent either the formation of a visible water layer over the solid particulate matter or the formation of a solid dry layer over the slurry. Initially, passes with the bulldozer are made every 10 minutes. Finally, and when the moisture content of the slurry was at 50%, bulldozer passes were made once every hour. In 600 hours time a moisture content of less than 50% and becoming suitable for compaction of the dredging spoils is attained.

This is the best mode contemplated by me for the practice of my invention at this time.

It will be appreciated that modifications can be made to my invention. For example, the use of shallow lagoons is not specifically required. Moreover, the specific means of agitation set forth herein is only exemplary. Other forms of agitation of solids or waters comprising a slurry mix can be used. Likewise, other modifications of the present invention can be made.

I claim:

1. A process of evaporating water from a soil-water slurry comprising the steps of: selecting a slurry having particulate solids having a density greater than water, at least some of said particulate solids having a size sufficient to pass a 200 mesh screen; depositing said slurry in a container with the surface of the slurry exposed to the atmosphere; and periodically agitating said slurry at at least the air slurry interface to prevent the formation of a solid film between the atmosphere and said slurry to produce accelerated evaporation to the atmosphere of water in said slurry.

2. The invention of claim 1 wherein said container is a shallow lagoon and said agitating step comprises driving equipment across the bottom of said lagoon to agitate at least the air-slurry interface of said lagoon intermittently to prevent the formation of a dry skin over the surface of said lagoon.

3. A process of evaporating water from a soil-water slurry comprising the steps of: selecting a slurry having particulate solids having a density greater than water, at least some of said particulate solids having a size sufficient to pass a 200 mesh screen; depositing said slurry in a container with the surface of the slurry exposed to the atmosphere; and, periodically agitating at least the air-slurry interface of said slurry to prevent the formation of a visible water layer between the solid particulate matter of said slurry and the atmosphere to produce accelerated evaporation to the atmosphere of water in said slurry.

4. The invention of claim 3 wherein said container is a shallow lagoon and said agitating step comprises driving equipment across the bottom of said lagoon to agitate at least the air-slurry interface of said lagoon intermittently to prevent the formation of a visible layer over said slurry.

* * * * *